United States Patent
Heine et al.

(10) Patent No.: US 11,187,472 B2
(45) Date of Patent: Nov. 30, 2021

(54) HEAT EXCHANGER FOR A MOTOR VEHICLE AND CORRESPONDING PRODUCTION METHOD

(71) Applicant: Mahle International GmbH, Stuttgart (DE)

(72) Inventors: Reinhard Heine, Leutenbach (DE); Pawel Rachwalski, Ostrow Wlkp (PL)

(73) Assignee: Mahle International GmbH

( * ) Notice: Subject to any disclaimer, the term of this patent is extended or adjusted under 35 U.S.C. 154(b) by 168 days.

(21) Appl. No.: 16/711,414

(22) Filed: Dec. 11, 2019

(65) Prior Publication Data

US 2020/0191505 A1    Jun. 18, 2020

(30) Foreign Application Priority Data

Dec. 12, 2018 (DE) .......................... 102018221487.5

(51) Int. Cl.
| F28F 7/00 | (2006.01) |
| F28F 9/18 | (2006.01) |
| B60H 1/00 | (2006.01) |

(52) U.S. Cl.
CPC .......... *F28F 9/182* (2013.01); *B60H 1/00321* (2013.01); *F28F 2275/04* (2013.01); *F28F 2275/122* (2013.01)

(58) Field of Classification Search
CPC ...... F28F 9/182; F28F 9/16; F28F 9/12; F28F 9/14; F28F 2275/04; F28F 2275/122; B60H 1/00321
USPC ........................................ 165/76, 149, 153
See application file for complete search history.

(56) References Cited

U.S. PATENT DOCUMENTS

| 4,331,201 A | * | 5/1982 | Hesse | .................... | B23P 11/00 |
| | | | | | 165/149 |
| 4,378,174 A | * | 3/1983 | Hesse | .................... | B21D 39/02 |
| | | | | | 165/149 |
| 4,461,348 A | * | 7/1984 | Toge | .................... | F28F 9/0226 |
| | | | | | 165/149 |

(Continued)

FOREIGN PATENT DOCUMENTS

| AT | 608463 A1 | 1/2011 |
| DE | 1606257 U | 5/1950 |

(Continued)

OTHER PUBLICATIONS

English abstract for DE-10250342.
English abstract for DE-102007046590.
English abstract for AT-508463.

*Primary Examiner* — Claire E Rojohn, III
(74) *Attorney, Agent, or Firm* — Fishman Stewart PLLC

(57) ABSTRACT

A heat exchanger for a method vehicle and a method of producing a heat exchanger are disclosed. The heat exchanger includes a heat exchanger block closed by a side part. The heat exchanger block has a tube bottom including a deformable hook, and the side part includes a tab provided complementary to a corner region of the tube bottom. The tab has a section, that abuts on a front side of the tube bottom, that includes a through opening or depression. A material portion of the hook is displaced through the through opening or depression via a graining in an assembled state, such that the axes of the through opening and the graining are offset and parallel to one another.

20 Claims, 2 Drawing Sheets

(56) References Cited

U.S. PATENT DOCUMENTS

| | | | | |
|---|---|---|---|---|
| 4,531,578 A * | 7/1985 | Stay | ...................... | F28F 9/0226 165/175 |
| 4,649,628 A * | 3/1987 | Allemandou | ......... | F28F 9/0226 165/148 |
| 5,535,819 A * | 7/1996 | Matsuura | .............. | F28F 9/0224 165/149 |
| 5,713,217 A * | 2/1998 | Baba | ....................... | F25B 39/04 62/509 |
| 6,006,430 A * | 12/1999 | Fukuoka | ................. | F28F 9/001 29/890.03 |
| 6,179,050 B1 * | 1/2001 | Dey | ........................ | F28F 9/001 165/149 |
| 8,800,642 B2 * | 8/2014 | Ninagawa | .............. | F28F 9/001 165/149 |
| 10,302,373 B2 * | 5/2019 | Tian | ...................... | F28F 21/089 |
| 10,837,707 B2 * | 11/2020 | Hakamata | ................. | F28F 9/02 |
| 2002/0029866 A1 * | 3/2002 | Gille | ........................ | F28F 9/002 165/76 |
| 2005/0016717 A1 * | 1/2005 | Lamich | ................... | F28F 9/001 165/149 |
| 2005/0230089 A1 | 10/2005 | Ozaki | | |
| 2006/0137866 A1 * | 6/2006 | Hernandez | ............ | F28F 9/0226 165/149 |
| 2007/0012424 A1 * | 1/2007 | Kamiya | ................ | F28F 9/0217 165/81 |
| 2008/0078540 A1 * | 4/2008 | Loewe | ................. | F28F 21/067 165/173 |
| 2009/0188653 A1 * | 7/2009 | Xu | ........................ | F28F 9/0224 165/148 |
| 2009/0255657 A1 * | 10/2009 | Hakamata | ............. | F28F 9/0226 165/178 |
| 2010/0252244 A1 * | 10/2010 | Ninagawa | ............ | B23K 1/0012 165/177 |
| 2011/0120671 A1 * | 5/2011 | Brauning | ................ | F28F 21/06 165/96 |
| 2012/0024508 A1 * | 2/2012 | Kroetsch | ................. | F28F 9/001 165/173 |
| 2012/0118543 A1 * | 5/2012 | Ninagawa | ........... | F28D 1/05366 165/148 |
| 2013/0089370 A1 * | 4/2013 | Heine | .................. | F02B 29/0475 403/28 |
| 2014/0332190 A1 * | 11/2014 | Riondet | ................ | F28F 9/0226 165/153 |
| 2015/0159963 A1 * | 6/2015 | Ghiani | ...................... | F28F 1/10 165/181 |
| 2018/0252480 A1 * | 9/2018 | Kolb | ..................... | F28F 9/084 |
| 2018/0292147 A1 * | 10/2018 | Heine | ...................... | F01P 3/18 |
| 2020/0064084 A1 * | 2/2020 | Tian | ........................ | F28F 9/001 |
| 2020/0191505 A1 * | 6/2020 | Heine | ................. | F28D 1/05316 |
| 2020/0224982 A1 * | 7/2020 | Harris | ................... | F28F 9/0224 |
| 2021/0041177 A1 * | 2/2021 | Holmes | ............... | F28D 1/05308 |
| 2021/0071961 A1 * | 3/2021 | Galland | ................ | F28F 9/0075 |

FOREIGN PATENT DOCUMENTS

| | | |
|---|---|---|
| DE | 10250342 A1 | 5/2004 |
| DE | 102007046590 A1 | 4/2009 |
| WO | 02077559 A1 | 10/2002 |

* cited by examiner

HEAT EXCHANGER FOR A MOTOR VEHICLE AND CORRESPONDING PRODUCTION METHOD

CROSS-REFERENCE TO RELATED APPLICATION

This application claim priority to German Application No. DE 10 2018 221 487.5 filed on Dec. 12, 2018, the contents of which are hereby incorporated by reference in its entirety.

TECHNICAL FIELD

The invention relates to a heat exchanger for a motor vehicle. The invention also relates to a method for producing the heat exchanger.

BACKGROUND

To be able to meet rising stability demands on modern heat exchangers, a reliable and simultaneously high-quality soldering is required between the side parts and the respective tube bottoms of a heat exchanger. To be able to ensure such a reliable soldering, a reliable mechanical fixation of the respective side part to the associated tube bottom, in turn, is indispensable, and a contact surface is desirable, which is as extensive as possible and via which the later soldering takes place.

The disadvantage of the heat exchangers known from the prior art is that a soldering of the side parts can only take place on a front side of the respective tube bottom, but not on a bottom side thereof, because the side parts are only fixed in one direction in response to the preassembly. This often takes place via deformable hooks, which, when bending or when attaching to the respective side part or a tab of the side part, respectively, push the latter away from the bottom side of the tube bottom, whereby no or only an unreliable soldering takes place there.

The present invention thus deals with the problem of specifying an improved or at least an alternative embodiment for a heat exchanger of the generic type, which overcomes the disadvantages known from the prior art.

This problem is solved according to the invention by means of the subject matter of the independent claim(s). Advantageous embodiments are subject matter of the dependent claims.

SUMMARY

The present invention is based on the general idea of designing a mechanical pre-fixation of a side part to a tube bottom of a heat exchanger in such a way that a reliable fixation of the surface areas, which are to be soldered to one another, and thus also a later reliable soldering, takes place therewith. The heat exchanger according to the invention has a heat exchanger block comprising a plurality of flat tubes, through which a fluid can flow, as well as heat exchanger structures arranged therebetween, for example corrugated fins. The flat tubs are thereby tightly received in a tube bottom on the longitudinal end side, concretely in the passages arranged in the tube bottom. The heat exchanger block is closed on both sides by means of a side part each, wherein the respective side part is connected mechanically and by means of a substance-to-substance bond to the tube bottom via a soldered connection. According to the invention, the tube bottom now has a front side and a bottom side, which merge into one another via a rounded corner region. The bottom side is thereby the side comprising the passage openings, which receive the flat tubes. On its front side, the tube bottom has a deformable hook. The side part, in turn, has a tab, which is arranged on the longitudinal end side and which is embodied complementary to the rounded corner region of the tube bottom, and which thus abuts flat on the front side, the corner region, and the bottom side of the tube bottom, at least in some regions, in the assembled state. The tab furthermore has a section, which abuts on the front side of the tube bottom, comprising a through opening, for example a bore, or depression, wherein, in the case of assembled heat exchanger, the hook engages around the section of the tab and is pressed thereto and thus establishes the mechanical connection. In the case of assembled heat exchanger, a material portion of the hook is also displaced into the through opening or depression by means of a graining, wherein an axis of the through opening or depression and an axis of the graining are arranged so as to be offset parallel to one another, so that the tab is pulled towards the tube bottom, and the tab is thus concretely pulled towards the bottom side and the corner region of the tube bottom, in response to a production of the graining. In particular the parallelism of the axes of the graining and of the through opening or depression thereby have the effect that a movement of the side part away from the tube bottom, which may occur in response to the mechanical deformation of the hook, is reversed again. Due to the, preferably flat, abutment of the tab, which is embodied complementary to the outer contour of the tube bottom, a large and continuous contact surface can be provided there, via which a reliable soldering takes place. The evasive movements of the side part relative to the tube bottom, which currently occur in response to the mechanical pre-fixation of the heat exchanger, can thus be compensated by means of the heat exchanger according to the invention, whereby a significantly more extensive abutment of the side part can be attained via its tab on the tube bottom, and thus a significantly more high-quality and more stable soldering.

A first tooth contour is advantageously provided on the section of the tab. Such a first tooth contour can have, for example, a number of parallel rows of teeth or individual teeth, and in particular serves for a positive connection between the tab and the hook or the front side of the tube bottom, respectively. Additionally or alternatively, a second tooth contour can be provided on the hook, wherein the first tooth contour can be pressed in a positive manner with the second tooth contour in this case, when the heat exchanger is assembled. A burying into the respective opposite side and thus a high-strength positive connection can thereby be attained via the two tooth contours. Such a reliable mechanical fixation of the tube bottom on the side part thereby also promotes a subsequent quality of the soldered connection.

The first tooth contour and the second tooth contour advantageously have rows of teeth, which are orthogonal to one another. A significantly improved micro-toothing can be attained thereby, because the two tooth contours do not touch one another in a flat or line-shaped manner, but only in a punctiform manner, and thus also bury into one another in a punctiform and deeper manner in response to being pressed. Such tooth contours can be produced comparatively easily by means of corresponding deformation processes in response to the production of the side part or of the tube bottom, respectively, in particular also by means of corresponding embossing dies.

In the case of a further advantageous embodiment of the solution according to the invention, two guide contours, between which the hook of the tube bottom is arranged in the assembled state, are provided on the section of the tab of the side part. The two guide contours, which can generally also be position contours, thus force an exact alignment of the side part relative to the tube bottom, and thus increase the manufacturing tolerances, which can be attained.

The side part advantageously has at least one reinforcing bead, which stiffens the tab. To be able to attain a reliable, in particular flat, connection between the tab of the side part and the front side, the rounded corner region and the bottom side of the tube bottom in response to the mechanical connecting as well as in response to a soldering, which takes place later, it is advantageous to provide such a reinforcing bead at the transition of the side part to the tab thereof, which prevents an unintentional deformation of the tab in response to the mechanical fixation thereof to the tube bottom as well as in response to a later soldering. Such a reinforcing bead can thereby be produced easily by means of a corresponding deformation method and can take place simultaneously with the production of the side part.

The present invention is further based on the general idea of specifying a method for producing the above-described heat exchanger for a motor vehicle, in which a heat exchanger block comprising a plurality of parallel flat tubes and heat exchanger structures arranged therebetween, for example corrugated fins, is initially produced. The flat tubes are thereby inserted into associated through openings or passages, respectively, of a tube bottom, on the longitudinal end side. The heat exchanger block is subsequently closed on both sides by means of a side part each. The tube bottom thereby has a front side and a bottom side, which merge into one another via a rounded corner region. A deformable hook, which provides for a mechanical fixation of the side part to the tube bottom, is also provided on the front side. The side part, in turn, has a tab arranged on the longitudinal end side, which is embodied complementary to the rounded corner region of the tube bottom, and which thus abuts flat on the front side, the corner region, and the bottom side of the tube bottom, at least in some regions, in the assembled state. The tab has a section, which abuts on the front side of the tube bottom, comprising a through opening or depression, wherein the hook engages around this tab in response to the assembly of the heat exchanger. The hook is thereby simultaneously pressed with the tab, in particular a positive connection is established. After the deformation of the hook, a material portion of the hook is displaced into the through opening or depression by means of graining, wherein an axis of the through opening or depression and an axis of the graining are arranged so as to be offset parallel to one another here, so that the tab is pulled towards the bottom side and/or the rounded corner region of the tube bottom, and the tab is thus pulled towards the bottom side and/or the rounded corner region of the tube bottom in response to a production of the graining. It can be ensured thereby that the tab abuts on the bottom side as well as on the rounded corner region, and the front side of the tube bottom, and can subsequently be soldered there with high quality. Purely theoretically, the through opening can thereby also be embodied as elongated hole. In particular a currently observable moving away in response to the deformation of the hook can be compensated by means of the method according to the invention, whereby a contact surface, which is significantly larger for the later soldered connection, can be provided, which provides for a significantly more stable soldered connection. The material displacement in response to the graining can thereby be attained by means of a striking or rotating movement.

Further important features and advantages of the invention follow from the subclaims, from the drawings, and from the corresponding figure description on the basis of the drawings.

It goes without saying that the above-mentioned features, and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
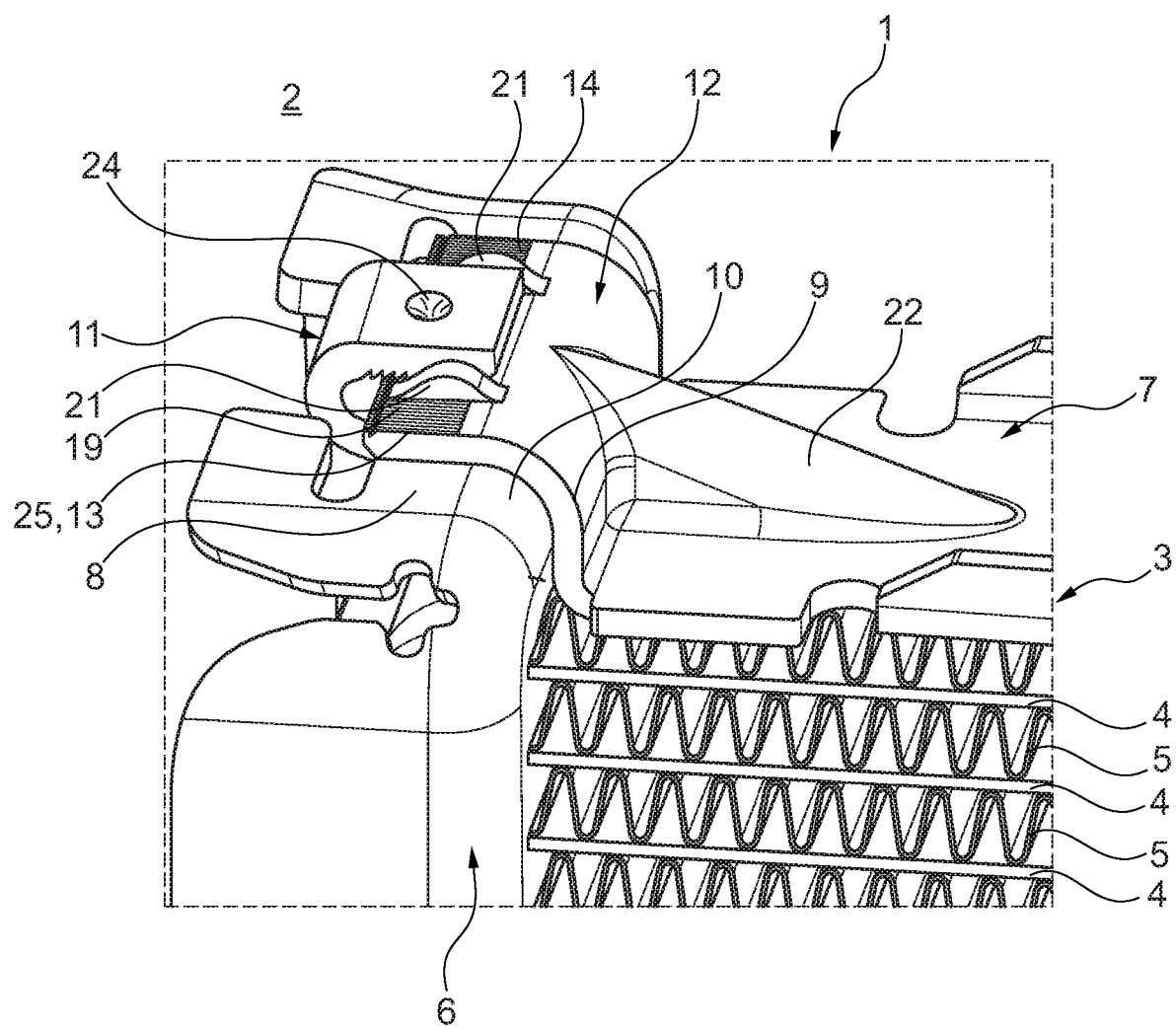
FIG. 1 shows a view onto a heat exchanger according to the invention prior to the soldering.

According to FIG. 1, a heat exchanger 1 according to the invention for a motor vehicle 2 has a heat exchanger block 3, which has a plurality of parallel flat tubes 4, through which a fluid can flow, as well as heat exchanger structures 5 arranged therebetween, for example corrugated fins. The flat tubes 4 are thereby tightly received in a respectively associated tube bottom 6 on the longitudinal end side, in particular inserted into non-illustrated passages of the tube bottom 6, and are tightly soldered therein. The heat exchanger block 3 is closed on both sides by means of a side part 7 each (see also FIGS. 2 and 3), wherein the respective side part 7 is connected mechanically and by means of a substance-to-substance bond to the tube bottom 6 via a soldered connection. According to the invention, the tube bottom 6 now has a front side 8 and a bottom side 9, which merge into one another via a rounded corner region. 10. On its front side 8, the tube bottom 6 has a deformable hook 11. On the longitudinal end side, the side part 7 has a tab 12, which is embodied complementary to the rounded corner region 10 of the tube bottom 6, and which abuts, preferably flat, on the front side 8, the corner region 10, and the bottom side 9 of the tube bottom 6 in the assembled state. A comparatively large contact surface 13 can be created thereby, which is available for the soldered connection 25. The tab 12 has a section 14, which abuts on the front side 8 of the tube bottom 6, comprising a through opening or depression 15 (see in particular FIGS. 2 and 3). The through opening or depression 15 can thereby be embodied as bore. In the case of assembled heat exchanger 1, as it is shown according to FIGS. 1 and 3, the hook 11 engages around the section 14 of the tab 12 and is furthermore pressed thereto. In the case of assembled heat exchanger 1, a material portion 16 (see FIG. 3) of the hook 11 is furthermore displaced into the through opening or depression 15 by means of a graining 24, wherein an axis 17 of the through opening or depression 15 and an axis 18 of the graining 24 are arranged so as to be offset parallel to one another, for example by a distance of a=0.5 mm, so that the tab 12 is pulled towards the bottom side 9 of the tube bottom 6 in response to a production of the graining 24.

Figure 3:
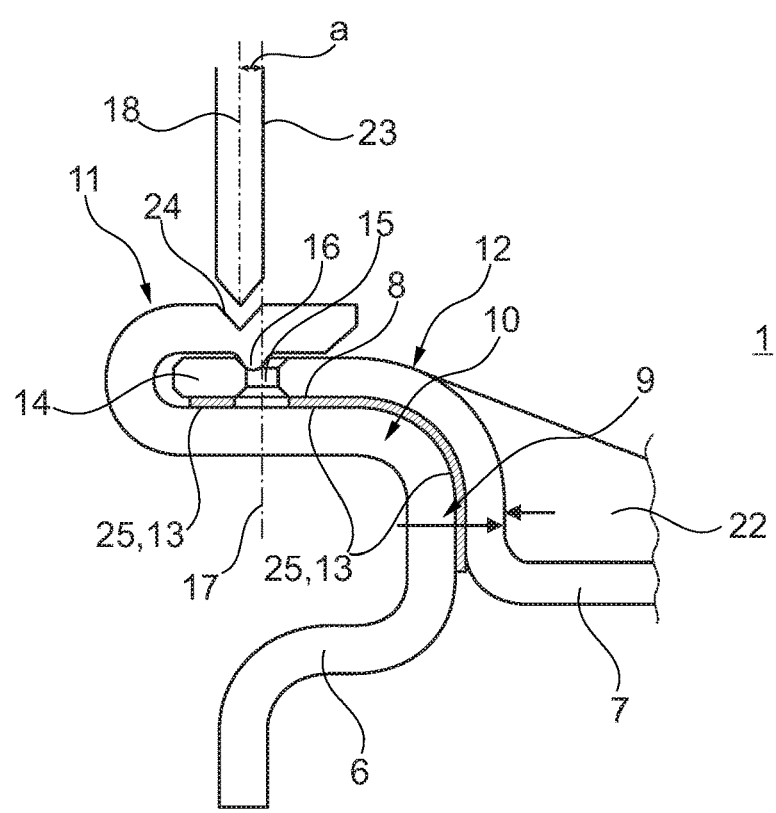
FIG. 3 shows a sectional illustration through a hook of a tube bottom and a tab of a side part when the connection is closed.

According to FIG. 3, the axis 18 of the graining 24 is thereby offset by the distance a in the direction of the free edge of the section 14 to the axis 17 of the through opening or depression 15. In response to a production of the graining 24, the section 14 is thereby pulled into the space surrounded by the hook 11, which is bent in a U-shaped manner.

Figure 2:
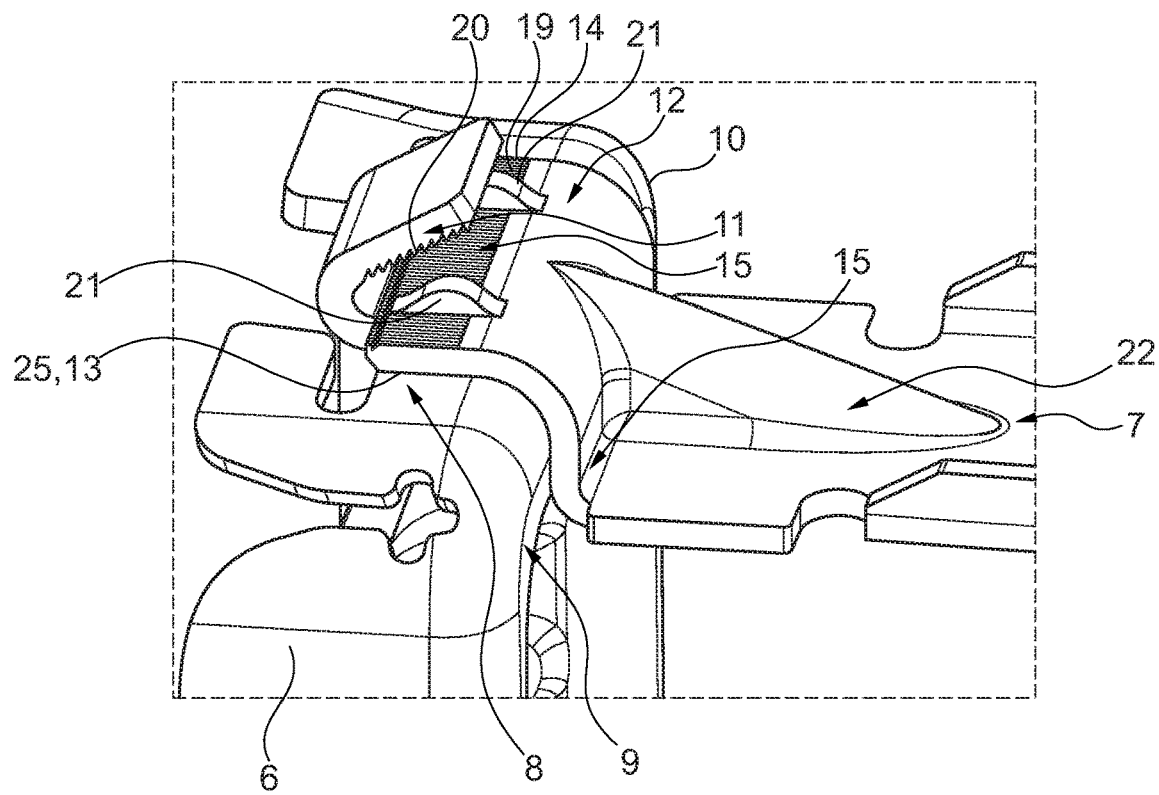
FIG. 2 shows a detail view of a not yet completed connection between a side part and a tube bottom of a heat exchanger according to the invention.

When furthermore looking at FIGS. 1 and 2, it can be seen that a first tooth contour 19 is provided on the section 14 of the tab 12, while a second tooth contour 20 is provided on the hook 11. In the case of assembled heat exchanger 1, the first tooth contour 19 is thereby pressed with the second tooth contour 20 in a positive manner, whereby it is obviously clear that both tooth contours 19, 20 as well as only one of the two tooth contours 19, 20 is provided.

When looking at FIG. 2 more closely, it can be seen that the first and second tooth contour 19, 20 have rows of teeth, which are orthogonal to one another, which provides the large advantage that, in response to a pressing of the hook 11 with the section 14 of the tab 12 of the side part 7, an only punctiform contacting initially takes place between the two tooth contours 19 and 20, so that the latter can bury deep inside one another and thus form a particularly reliable positive connection.

When looking at FIGS. 1 and 2 once again, they show that two guide contours 21 are provided on the section 14, between which the hook 11 is arranged in the assembled state and is thus guided or positioned, respectively. It goes without saying that only a single or more than two guide contours 22 can be provided thereby. According to FIGS. 1 to 3, a reinforcing bead 22 can furthermore be seen, which is arranged between the side part 7 and the tab 12, and which stiffens the tab 12. It goes without saying that a plurality of reinforcing beads 22 can also be arranged there.

The heat exchanger 1 according to the invention is thereby produced as follows:

First of all, a heat exchanger block 3 comprising a plurality of parallel flat tubes 4 and heat exchanger structures 5 arranged therebetween is produced, wherein the flat tubes 4 are inserted into the respectively associated through openings or passages, respectively, on the tube bottom 6 on the longitudinal end side. The heat exchanger block 3 is thereby closed on both sides by means of a side part 7 each. The hook 11 is subsequently deformed on the tube bottom 6 and is thus pressed with the section 14 of the tab 12 on the side part side. This state is illustrated according to FIGS. 1 and 3, wherein the hook 11 engages around the tab 12 in its section 14 in this state. Once the hook 11 is deformed, a graining of the latter takes place, whereby a material portion 16 (see FIG. 3) of the hook 11 is displaced into the through opening or depression 15 of the section 14 of the tab 12 of the side part 7, and whereby a graining 23 is attached with its axis 18 offset to the axis 17 of the through opening or depression 15, so that the tab 12 is pulled towards the bottom side 9 of the tube bottom 6 in response to to production of the graining 24 and thus a material displacement into the through opening or depression 15. In response to the introduction of the graining 24, a pressing between the hook 11 and the section 14 can also take place, in particular if a first and/or second tooth contour 19, 20 are/is provided there. The side part 7 is subsequently soldered via its tab 12, in particular flat, to the front side 8, the corner region 10, and the bottom side 9 of the tube bottom 6 via the contact surface 13. The corner region 10 thereby does not need to be soldered in a flat or complete manner with the tube bottom 6.

A heat exchanger 1 according to the invention can thus be produced by means of the method according to the invention, which provides for a comparatively large contact surface 13 between the tube bottom 6 and the side part 7 or the tab 12 of the side part 7, respectively, wherein a currently occurring escape of the side part 7 and thus removal of the tab 12 from the bottom side 9 of the tube bottom 6 can be avoided by means of the graining 24.

The invention claimed is:

1. A heat exchanger for a motor vehicle, comprising:
a heat exchanger block including a plurality of flat tubes and heat exchanger structures arranged therebetween,
wherein the plurality of flat tubs are tightly received in a tube bottom on a longitudinal end side,
wherein the heat exchanger block is closed on both sides via a respective side part,
wherein the respective side part is connected mechanically and via a substance-to-substance bond to the tube bottom via a soldered connection,
the tube bottom has a front side and a bottom side that merge into one another via a rounded corner region,
the tube bottom has a deformable hook on a front side thereof,
the respective side part has a tab on the longitudinal end side provided complementary to the rounded corner region of the tube bottom, wherein the tab abuts via a contact surface on the front side, the corner region, and the bottom side of the tube bottom in an assembled state,
the tab has a section, which abuts on the front side of the tube bottom, comprising a through opening or depression,
the hook engages around the section of the tab and is pressed thereto in the assembled state,
wherein a material portion of the hook is displaced into the through opening or depression via a graining in the assembled state, and
wherein an axis of the through opening or depression and an axis of the graining are arranged offset and parallel to one another such that the tab is pulled towards the bottom side of the tube bottom in response to a production of the graining.

2. The heat exchanger according to claim 1, further comprising a first tooth contour is provided on the section of the tab.

3. The heat exchanger according to claim 1, further comprising a second tooth contour provided on the hook.

4. The heat exchanger according to claim 3, further comprising a first tooth contour provided on the section of the tab, wherein the first tooth contour is pressed in a positive manner with the second tooth contour in the assembled state.

5. The heat exchanger according to claim 4, wherein the first tooth contour and the second tooth contour have rows of teeth structured and arranged orthogonal to one another.

6. The heat exchanger according to claim 1, further comprising two guide contours, between which the hook is arranged in the assembled state, provided on the section of the tab.

7. The heat exchanger according to claim 1, wherein the through opening or depression is a bore.

8. The heat exchanger according to claim 1, wherein the respective side part has at least one reinforcing bead, structured and arranged to stiffen the tab.

9. A method for producing a heat exchanger for a motor vehicle, comprising:
- providing a heat exchanger block comprising a plurality of parallel flat tubes and heat exchanger structures arranged therebetween, wherein the plurality of flat tubes are each inserted into a tube bottom on a longitudinal end side, wherein the tube bottom has a front side and a bottom side that merge into one another via a rounded corner region,
- closing the heat exchanger block on both sides via a respective side part,
- the front side of the tube bottom having a deformable hook,
- providing a tab on a longitudinal end side of the respective side part complementary to the rounded corner region of the tube bottom, and abutting the tab via a contact surface on the front side, the corner region, and the bottom side of the tube bottom in an assembled state,
- the tab having a section abutting on the front side of the tube bottom that includes a through opening or depression,
- in response to the assembled state, the hook is pressed with the section of the tab and engages around said section,
- displacing a material portion of the hook into the through opening or depression via a graining, wherein an axis of the through opening or depression and an axis of the graining are arranged offset and parallel to one another, such that the tab is pulled towards the bottom side of the tube bottom in response to a production of the graining, and
- soldering the respective side part to the front side, the corner region, and the bottom side of the tube bottom via its tab via the contact surface.

10. The method according to claim 9, further comprising arranging the hook between two guide contours provided on the section of the tab in the assembled state.

11. The method according to claim 9, further comprising pressing a first tooth contour provided on the section of the tab in a positive manner with a second tooth contour provided on the hook in the assembled state.

12. The heat exchanger according to claim 2, wherein the section of the tab includes two guide contours, and wherein the hook is arranged between the two guide contours in the assembled state.

13. The heat exchanger according to claim 2, wherein the through opening or depression is a bore.

14. The heat exchanger according to claim 2, wherein the respective side part includes at least one reinforcing bead, structured and arranged to stiffen the tab.

15. The heat exchanger according to claim 2, further comprising a second tooth contour provided on the hook, wherein the first tooth contour and the second tooth contour each have rows of teeth arranged orthogonal to one another.

16. The heat exchanger according to claim 5, wherein the section of the tab includes two guide contours, and wherein the hook is arranged between the two guide contours in the assembled state.

17. The heat exchanger according to claim 6, further comprising a tooth contour provided on at least one of the tab and the hook.

18. The heat exchanger according to claim 17, wherein the tooth contour includes rows of teeth.

19. The heat exchanger according to claim 17, wherein the respective side part includes at least one reinforcing bead, structured and arranged to stiffen the tab.

20. The heat exchanger according to claim 19, wherein the through opening or depression is a bore.

\* \* \* \* \*